United States Patent Office 3,835,078
Patented Sept. 10, 1974

3,835,078
METHOD OF REMOVING FLOOR POLISH COMPRISING COPOLYMER CONTAINING α,β-ETHYLENICALLY UNSATURATED CARBOXYLIC ACID AND POLYVALENT METAL COMPOUND
Richard E. Zdanowski, Fort Washington, Pa., assignor to Rohm and Haas Company, Philadelphia, Pa.
No Drawing. Continuation-in-part of application Ser. No. 640,852, May 24, 1967, which is a division of application Ser. No. 532,897, Mar. 9, 1966, now Patent No. 3,328,325, which in turn is a continuation-in-part of abandoned applications Ser. No. 238,007 and Ser. No. 238,008, both Nov. 15, 1962. This application Oct. 1, 1971, Ser. No. 185,821
The portion of the term of the patent subsequent to Mar. 7, 1984, has been disclaimed
Int. Cl. C08f 29/12, 29/36, 45/52
U.S. Cl. 260—28.5 A        8 Claims

ABSTRACT OF THE DISCLOSURE

This invention is concerned with the removal of a floor polish film deposited on a floor from an aqueous dispersion having a pH of about 7 to 11, and containing water, a wax, a water insoluble addition polymer obtained by the emulsion polymerization of monoethylenically unsaturated monomers, including an α,β-ethylenically unsaturated carboxylic acid, and a dispersing agent in a proportion from 0.5 to 20% by weight, based on the total weight of polymer and wax, any content of a member selected from the group consisting of wax-soluble resins and gums and alkali-soluble resins being not over 50% by weight, based on the weight of the polymer, any alkali-soluble resin, if present, preferably being selected from the group consisting of shellac, Manila gum, Loba gum, and alkali-soluble alkyds or polyesters, the proportions of polymer and wax being about 10 to 95 parts by weight of the polymer to 5 to 90 parts by weight of the wax. The composition also contains (1) about 1% to 50% by weight, based on the weight of the polymer, of a polyvalent metal compound dissociable in the composition to form polyvalent metal-containing ions, and (2) from 0 to 100% by weight, based on the weight of organic film-forming material, of a pigment or filler, the total solids of the composition being from about 8% to 45% by weight. It also concerns a method of coating substrates therewith and of removing the coating from the substrates; also the coated substrates. The invention is particularly concerned with the removal of such coating films with alkaline removing compositions, particularly those containing aqueous ammonia, by applying the cleaning solution to the film coating, and removing the coating from the substrate.

This application is a continuation-in-part of my copending application Ser. No. 640,852, filed May 24, 1967, which is a division of my application Ser. No. 532,897, filed Mar. 9, 1966, now Pat. No. 3,328,325, which is in turn a continuation-in-part of each of my copending applications Ser. Nos. 238,007 and 238,008, both filed Nov. 15, 1962, and both now abandoned.

This invention relates to the removal of coating compositions and especially floor polishes which gives a particularly glossy film on wood, rubber, glass, tile and linoleum surfaces.

Many floor polishing compositions heretofore used and comprising a water-insoluble emulsion polymer, a wax, and a dispersing agent are removable by the application of an aqueous alkaline medium. They are purposely made to be removable in this way so that the user can, if he so desires, readily remove previously applied polishes especially when they have become dirty or are marred after extensive use. Floor polish compositions are often alkaline in nature, and because of their alkalinity they may partially redisperse a previously applied polish and make the application of the fresh polish difficult or irregular because of changes in viscosity, or consistency as a result of the redispersion mentioned.

It is an object of the present invention to inhibit or prevent the redispersion of previously applied polishes by a fresh polish during application of the latter.

In accordance with the present invention, it has been found that the difficulties resulting from such redispersion can be avoided by including in the freshly applied polish a small amount of polyvalent metal compounds dissociable in aqueous media into polyvalent metal-containing ions. The polyvalent metal in the coating, apparently in combination with the free carboxyl groups from the acid monomer in the copolymer, acts in some way to prevent the streaking and partial redispersion of previous coatings, and yet the coating can be removed by alkaline remover, particularly aqueous ammonia.

The polishing compositions of the present invention can generally be defined in terms of the following proportions of the main constituents:

| Constituent: | Proportion |
|---|---|
| A. Water - insoluble addition polymer | 10–95 parts by weight. |
| B. Wax | 5–90 parts by weight. |
| C. Alkali-soluble resin | 0–40 parts by weight. |
| D. Wetting, emulsifying and dispersing agents | 0.5–20% on weight of A+B+C. |
| E. Polyvalent metal compound | 1% to 50% on weight of A. |
| F. Water | To make total solids of 8% to 45%. |

The total of A and B should be 100. The amount of C when present may be from 1% to 50% of the weight of the copolymer.

For a non-buffable, self-polishing composition, the wax should be not over 35 parts by weight, preferably 5 to 25 parts by weight in 100 parts total of polymer plus wax according to the formulation of the above table. For a buffable composition, the wax should be at least 35 parts by weight on such total. Examples of wetting and dispersing agents include alkali metal and amine salts of higher fatty acids having 12 to 18 carbon atoms, such as sodium, potassium, ammonium, or morpholine oleate or ricinoleate, as well as the common nonionic surface active agents. Additional wetting agent improves the spreading action of the polish.

For polishing floors, the coating obtained from the composition should have a Knoop hardness number of 0.5 to 15 when measured on a film thereof 0.5–2.5 mil thick on glass. This range of hardness provides good resistance to abrasion and wear and can be obtained by the appropriate selection of monomers to be polymerized.

The polyvalent metal ions may be those of beryllium, cadmium, calcium, magnesium, zinc, barium, strontium, aluminum, bismuth, antimony, lead, cobalt, iron, nickel or any other polyvalent metal which can be added to the composition by means of an oxide, hydroxide, or basic, acidic, or neutral salt which has appreciable solubility in water, such as at least about 1% by weight therein. The ammonia and amine complexes (and especially those containing coordinated $NH_3$) of these metals, and especially of zinc and cadmium, are also useful. Such complex or coordinate compounds are initially readily soluble in the aqueous medium of the polish composition, especially at a pH of 6.5 to 10.5, and have the advantage of drying to form a polish deposit which is essentially innsoluble in water but still removable at a pH other than neutral, and especially at a pH of 7.5 to 11.

The amount of the polyvalent metal compound added may be from about 1% to 50% and is preferably about 2 to 20% by weight, based on the weight of the water-insoluble addition polymer in the composition.

Any water-innsoluble polymer obtainable by emulsion polymerization may be employed in the compositions of the present invention provided its hardness is such that the composition containing it deposits a film a Knoop hardness number (KGN) of at least 0.5 and preferably from about 1.2 to 10, though for many purposes the KHN of the coating film deposited may be as high as 15 or greater, when measured on a film of 0.5 to 2.5 mil thickness on a glass panel.

The water-insoluble polymer may be obtained by emulsion polymerization of one or more monoethylenically unsaturated monomers including the esters of an acid of the formula

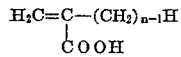

wherein $n$ is an integer having a value of 1 to 2 with benzyl alcohol, phenol, or a saturated monohydric aliphatic alcohol, especially in alkanol, having 1 to 18 carbon atoms, such as cyclopentanol, cyclohexanol, methanol, ethanol, n-propanol, isopropanol, n-butanol, isobutanol, sec-butanol, tert-butanol, any of the pentanol, hexanols, octanols, decanols, dodecanols, hexadecanols, and octadecanols. Preferred polymers are copolymers containing at least one of these esters of acrylic acid with one or more monomers selected from the group consisting of ($C_1$-$C_4$)-alkyl methacrylates, acrylonitrile, methacrylonitrile, vinyl acetate, styrene, vinyltoluene (o, m, or p), vinyl chloride or vinylidene chloride. In place of part or all of the acrylic acid ester component, the preferred type of polymer may contain a ($C_5$-$C_{18}$)-alkyl methacrylate. Blends of these copolymers may be used. The polymers may also be graft copolymers including grafts of the monomers mentioned on shellac.

The polymers may contain from 1 to 12% of an $\alpha,\beta$-monoethylenically unsaturated acid, such as maleic, fumaric, aconitic, crotonic, acrylic, methacrylic, or itaconic acid, the latter three being preferred, for the purpose of making the coatings deposited therefrom readily removable by the application of alkaline media, such as dilute aqueous ammonia. Alternatively the polymer may contain about 4 to 25% or more of polymerized units of at least one monomer containing amine groups to render the coatings deposited readily removable by the application of acid media, such as dilute aqueous acetic acid solutions. Examples of amine-containing monomers include any of vinylpyridines, or any compound of the formula

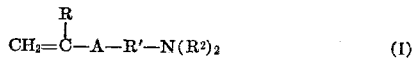

where

R is selected from the group consisting of H, Cl, and $CH_3$;

$R^2$ is selected from the group consisting of H and saturated aliphatic hydrocarbon groups having from 1 to 10 carbon atoms, A is selected from the group consisting of —O—, S,

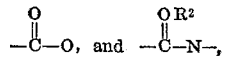

R' is a straight or branched chain alkylene group having from 2 to 10 carbon atoms. Members $R^2$ may be identical or different groups in their several occurrences in any particular compound.

Examples of monomers of formula I are: N-(3-dimethylamino)propyl methacrylate; t-butylaminoethyl methacrylate, dimethylaminoethyl methacrylate, N-($\beta$-dimethylamino)ethyl acrylamide; N-($\beta$-dimethylamino)-ethyl methacrylamide; 10-aminodecyl vinyl ether; 10-aminodecyl vinyl sulfide; 8-aminooctyl vinyl ether; diethylaminohexyl methacrylate; diethylaminoethyl vinyl ether; diethylaminoethyl vinyl sulfide; 5-aminopentyl vinyl ether; 3-aminopropyl vinyl ether; 2-aminoethyl vinyl ether; 2-aminoethyl vinyl sulfide; 2-aminobutyl vinyl ether; 4-aminobutyl vinyl ether; dimethylaminoethyl methacrylate; dimethylaminoethyl vinyl ether; dimethylaminoethyl vinyl sulfide; N-(3,5,5-trimethylhexyl) aminoethyl vinyl ether; N-cyclohexylaminoethyl vinyl ether; $\beta$-(t-butylamino)ethyl acrylate; 2-(1,1,3,3-tetramethylbutylamino)ethyl methacrylate; N-t-butylaminoethyl vinyl ether; N-methylaminoethyl vinyl ether; N-2-ethylhexylaminoethyl vinyl ether; N-t-octylaminoethyl vinyl ether.

Additional amines include

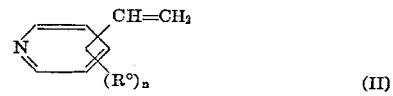

where $R^\circ$ is H or alkyl of 1 to 12 carbon atoms and $n$ is an integer having a value of 1 to 4. Examples include 2-vinylpyridine;
3-vinylpyridine;
4-vinylpyridine;
2-methyl-5-vinylpyridine;
5-methyl-2-vinylpyridine;
4-methyl-2-vinylpyridine;
2-ethyl-5-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-vinylpyridine;
2-methyl-5-undecyl-3-vinylpyridine;
3-dodecyl-4-vinylpyridine;
2,4-dimethyl-5,6-dipentyl-3-vinylpyridine;
2-decyl-5-($\alpha$-methylvinyl)-pyridine.

The amounts of acid or amine components in the polymers are preferably such that the polymer in the composition at a pH in the range of about 3.0 to 11.0 is water-insoluble. However, if desired, the copolymer when it contains acid may be soluble in aqueous alkaline media having a pH from 7.5 to 11 or higher. On the other hand, when the copolymer contains amine groups, it may be soluble in aqueous acid media having a pH from about 6 to 3 or lower. Such polymers are nevertheless appropriately called water-insoluble polymers.

In the compositions of the present invention, the relative proportions of the polymer to wax are from 95:5 to 10:90 by weight and preferably are about 40:60 to 95:5. The variation in these relative proportions provides for various buffing characteristics. The amount of an emulsifying or dispersing agent or agents is generally from 0.1 to 30%, and preferably 1 to 20%, of the combined weights of the copolymer and wax. The concentration of the aqueous dispersion may be from 8 to 45% solids and is preferably about 10 to 20% by weight of solids. The dispersion should have a pH of at least about 3.0 and it may be as high as 11.0 or more. Most advantageously, its pH is from about 7 to about 10 as the use of lower pH values requires the use of a non-ionic emulsifier for the wax and generally excludes the inclusion of any substantial amount of constituent C of the preceding table. Most available wax emulsions are based on alkaline dispersants so that a pH of 7 to 10 is normally most convenient. However, for special purposes the pH may be in the range of 3 to 6.5. Thus, in the case of vinyl acetate copolymers, a pH in this range minimizes hydrolysis of the vinyl ester units. Suitable alkaline or buffering agents, such as borax, sodium hydroxide, ammonia, or amines, may be introduced to adjust the pH to the desired value.

The copolymer is preferably made by the emulsion copolymerization of the several monomers in the proper proportions. Thus the monomers may be emulsified with an anionic, a cationic, or a nonionic dispersing agent, about 0.5% to 10% thereof being used on the weight of total monomers. The acid or amine monomer, if used, is of course soluble in water so that the dispersing agent serves to emulsify the other two monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalysts, may be used in proportions of ½ to 2% each based on the weight of monomers to be copolymerized. The temperature may be from room temperature to 60° C. or more as is conventional.

Suitable anionic dispersing agents include the sodium salts of the higher fatty acid sulfates, such as that of lauryl alcohol, the higher fatty acid salts, such as the oleates or stearates of morpholine, triethanolamine or mixed ethanolamines, or any of the nonionic types, such as ethylene oxide-modified higher fatty alcohols, such as lauryl alcohol, containing 20 to 50 ethylene oxide units, similarly modified long-chain mercaptans, fatty acids, amines, or the like.

If the polymer is initially prepared by emulsion polymerization using an anionic emulsifier exclusively, it is generally desirable to add a non-ionic emulsifier to the polymer dispersion before adding the compound providing the polyvalent metal cations. The amount of the non-ionic emulsifier needed depends on the amount of anionic emulsifier present and the amount of polyvalent metal compound to be added. Generally, about 0.1% to 5% or more of the non-ionic surfactant is adequate.

When the wax is separately dispersed, the dispersing agents mentioned above may similarly be used, but amine salts of soap, such as an ethanolamine oleate or stearate, are most useful. Suitable homogenizing mills may be used for assisting the dispersion.

The waxes or mixtures of waxes which may be used include waxes of a vegetable, animal, synthetic, and/or mineral origin, or mixtures thereof, such as carnauba, candelilla, montan, lanolin, cocoa butter, cottonseed, stearin, Japan wax, bayberry, myrtle, mace, palm kernel, beeswax, spermacetti, Chinese insect, mutton tallow, polyethylene, polypropylene, waxes obtained by the hydrogenation of coconut oils or soybean oils, and the mineral waxes such as paraffin, ceresin, montan, ozokerite, etc.

The compositions are adapted to form clear glossy coatings. However, if desired, a translucent appearance or an opaque or colored appearance may be obtained by the introduction of dulling agents, water-soluble or oil-soluble dyes, pigments or fillers in suitable proportions. Examples of suitable water-insoluble pigments which may be used include titanium dioxide, carbon black, iron blues, phthalocyanine blues and greens; metal oxides, hydroxides, sulfides, sulfates, silicates, and chromates; organic maroons, aluminum flake, bronze powders, pearl essence, and various fillers or extenders such as talc, barytes, china clay, and diatomaceous earth.

The amount of pigment may be varied widely, depending on the effect desired. The amount of pigments, by weight based on the weight of the organic film-forming material, may vary between about 2% for light, high-hiding pigments such as carbon black and about 100% for heavy, low-hiding pigments such as lead chromate.

The aqueous dispersions may contain up to about 75% by weight of a plasticizer whenever it is necessary in a particular application, to provide a lower temperature of film formation from the emulsion polymer dispersions. From 5 to 35% by weight of the plasticizer, based on the weight of copolymer, is quite practical.

Since the purpose of the plasticizer is usually to facilitate film formation, and since it is not always necessary to impart flexibility to the copolymer composition when it is inherently tough and flexible, as is often the case, a fugitive or semi-fugitive plasticizer may sometimes be preferred rather than a permanent plasticizer. However, permanent plasticizers may be used without the production of films having poor wear-resistance and poor resistance to water, since the proportion of plasticizer introduced is in most cases relatively small, generally being not over 30% by weight of the copolymer solids. Certain plasticizers, such as tributoxyethyl phosphate, serve also as leveling agents. Mixtures of fugitive and permanent plasticizers may also be used.

Examples of fugitive plasticizers include the monoethyl or monomethyl ether of diethylene glycol, isophorone, benzyl alcohol, and 3-methoxybutanol-1. Examples of essentially permanent plasticizers that are suitable include benzyl butyl phthalate, dibutyl phthalate, dimethyl phthalate, triphenyl phosphate, 2-ethyl hexyl benzyl phthalate, butyl cyclohexyl phthalate, mixed benzoic acid and fatty oil acid esters of pentaerythritol, poly(propylene adipate)dibenzoate diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene glycol diphthalate, di(methylcyclohexyl)-phthalate, tributoxyethyl phosphate, tributyl phosphate. The particular plasticizer and the amount thereof used are chosen in accordance with the demand for compatibility and efficiency in lowering the film-forming temperature.

Besides containing the copolymer, the wax, and a suitable dispersing or emulsifying agent and the optional pigments and fillers mentioned hereinabove, the composition of the present invention may also contain other ingredients such as wax-soluble resins or gums or alkali-soluble resins in an amount of 1% to 50% of the weight of the copolymer. Examples of the wax-soluble materials include terpene-phenolic resins, heat process ("run") Congo, wood rosin, oxidized petroleum wax, and so on.

Examples of alkali-soluble resins include shellac, Manila gum, Loba gum, and alkali-soluble alkyds, which are essentially polyesters of aliphatic dicarboxylic acids with aliphatic polyhydric alcohols which may be modified with $C_8$–$C_{18}$ fatty acids, glycerol esters of $C_8$–$C_{18}$ fatty acids, and resin acids, such as abietic or rosin. The resins disclosed in U.S. Pat. 2,063,542 may be used. These resins have acid numbers of about 100 to 145. Examples of the dicarboxylic acids include maleic, fumaric, adipic, sebacic, including anhydrides thereof. The polyhydric alcohols may be glycerol, pentaerythritol, trimethylolethane, and glycols having 2 to 8 carbon atoms including diethylene glycol and triethylene glycol. The concentration of the aqueous dispersion for application purposes may desirably be from 8 to 45% solids and is preferably from about 10 to 15% by weight of solids.

The compositions may be used for impregnating textiles, leather, paper, or other porous or fibrous materials. They may also be applied to plastic sheets such as cellophane, polyethylene, polyethylene glycol terephthalate, saran and the like. They may also be applied to rigid surfaces, including all sorts of metals such as steel, aluminum, copper, brass, bronze, tin, chromium, and wrought iron, and to wood, stone, masonry, brick, glass, asbestos cement shingles or siding, terrazzo, cement and concrete surfaces such as floors, and so on. The compositions are especially valuable for polishing floors, such as those made of wood, linoleum, rubber, and all sorts of plastic tiles, such as linoleum, asphalt, vinyl, and vinyl-asbestos.

For a non-buffable, self-polishing composition, the wax should be not over 35 parts by weight, preferably 5 to 25 parts by weight in the formulation of the above table. For a buffable composition, the wax should be at least 35 parts by weight. Examples of wetting and dispersing agents include alkali metal and amine salts of higher fatty acids having 12 to 18 carbon atoms, such as sodium, potassium, ammonium, or morpholine oleate or ricinoleate, as well as the common non-ionic surface active agents. Additional wetting agent improves the spreading action of the polish.

For polishing floors, the coating obtained from the composition should have a Knoop hardness of 0.5 to 15 when measured on a film thereof 0.5–2.5 mil thick on glass. This range of hardness provides good resistance to abrasion and wear and can be obtained by the appropriate selection of monomers to be polymerized.

The copolymer and wax (and resin when used) may be mixed in any order desired. For example, the wax or resin or both may be introduced into the aqueous polymer dispersion by adding a dispersion of the wax or resin or both to the copolymer dispersion or vice-versa. Preferably, the copolymer is added to a dispersion of the wax and then the resin is mixed in. The wax dispersion may be prepared using any of the anionic or non-ionic dispersing agents mentioned above for use in copolymerization. However, amine salts of soap such as ethanolamine or morpholine oleate or stearate are quite useful. Besides incorporating wax in floor polishing compositions, an additional plasticizer or a fugitive fluxing aid may be used to reach the desired minimum film-forming temperature of the composition.

The polyvalent metal salt may be incorporated into the composition at any time; generally, however, it is the last of the essential ingredients to be mixed in.

In the composition intended to be removed only by acid, it is generally the rule that no alkali-sensitive material such as an alkali-soluble resin is employed. However, with the amine-containing copolymers, it has been found that even though an alkali-soluble resin is present in substantial amounts, coatings therefrom having hardness in the range of 0.5 to 15 (Knoop hardness number) can be washed with soaps and alkaline detergents without a requirement of excessive care to prevent damage by partial or complete removal of the coating. However, it is preferred that the amount of alkali-soluble resin be less than 20% by weight of the total of polymer and wax solids in these acid-removable compositions.

The compositions have good storage stability under normal conditions of temperature. They may be applied in the usual manner by means of wiping cloths, by brushing, or by means of mops. They dry rapidly to clear or colored films, if pigmented, having hard and tough glossy surfaces. There is substantially no discoloration of the films on aging. The application of the compositions to surfaces carrying previously applied coatings of alkali-removable compositions does not remove appreciable amounts of such coatings, nor is the viscosity or consistency of the composition of the present invention detrimentally affected. Hence, the compositions go on the surface uniformly and with ease but without streakiness or other irregularities.

The compositions containing copolymers having carboxylate (acid or salt) groups are removable by dilute alkaline detergents. On the other hand, the compositions containing copolymers having amino groups are resistant to cleaning with soapy solutions or alkaline solutions such as dilute aqueous ammonia whenever it is necessary to clean the surfaces. These coatings, however, are readily removed with dilute aqueous acid solutions such as those containing from ½ to 5% by weight of acetic acid, boric acid, or phosphoric acid, whenever it is necessary, either because of accumulation of dirt or because of the need to paint or varnish the base surfaces, for such removal.

The following examples in which the parts and percentages are by weight unless otherwise indicated are illustrative of the invention.

EXAMPLE 1

(a) An emulsion copolymer was prepared with the following weight percent composition employing 3% sodium lauryl sulfate (based on total weight of the monomer) as the emulsifier and a conventional emulsion polymerization technique:

Ethyl acrylate _____ 45
Methyl methacrylate _____ 50
Methacrylic acid _____ 5

The $T_g$ of the polymer is calculated to be 31° C. by conventional and well-known procedures. The final polymer solids concentration of the emulsion was 38%. The emulsion was diluted with water to 15% polymer solids. The pH of the emulsion was adjusted to 6.5 using 14% $NH_4OH$.

(b) A mixture of 40 parts of emulsifiable low molecular weight polyethylene melting at about 75° C. and 8 parts of oleic acid was melted and 8 parts of morpholine was added to the mixture. The complete melt was added slowly to 184 parts of water heated to 205° F. while under vigorous agitation. The emulsion was allowed to cool and was then diluted to 15% solids.

(c) 15 parts of an ammonia-soluble alkyd resin was added to 62.5 parts of water containing 3.75 parts of 28% $NH_4OH$ solution and maintained at 50° C. The resulting solution was filtered and then diluted to 15% solids.

(d) Seventy-two and a half parts of the polymer dispersion in part (a) was mixed with eleven parts of wax emulsion from part (b) and 16.5 parts of alkyd solution from part (c). The resulting mixture was further modified by the addition of 0.35 part of tributoxyethyl phosphate, one and a half parts of ethylene glycol monoethyl ether, one and a half parts of diethylene glycol, 0.6 part of nonyl phenol modified with an average of 10 ethylene oxide units and .004 part of a fluorinated hydrocarbon surfactant of the formula $$C_8F_{17}SO_2N(C_2H_5)CH_2$$ 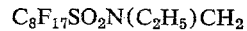

COOK hereinafter referred to as Surfactant F.

(e) 50 parts of the resultant floor polish was modified by the addition of 0.25 part of calcium chloride incorporated in the form of a powder.

(f) A homogeneous vinyl floor tile, 9″ x 9″ in size was divided into two equal parts. One half was coated with 1.5 mls. of the finished floor polish from (d) and the other half with 1.5 mls. of the calcium chloride modified polish from (e). After a 30-minute drying period at 25° C. and 50% relative humidity (R.H.), the tile halves were recoated with 1.5 mls. of the respective formulations. The tile half coated with the floor polish containing calcium chloride dried with a high level of gloss and a uniform degree of leveling. The section of tile coated with the unmodified polish from section (d) was dull, mottled and had many rough spots which are normally associated with redispersion of the first polish coat upon the application of a new one. Both floor polishes were removed readily with a 3% water solution of $NH_4OH$.

EXAMPLE 2

Example 1 was repeated substituting 0.25 part of cadmium sulfate for calcium chloride in part (e). Similar results were obtained as in Example 1.

EXAMPLE 3

Example 1 was repeated with the following changes in part (a):

Emulsifier—4% (based on the weight of the monomers) of octyl phenol modified with an average of 30 ethylene oxide groups used in place of sodium lauryl sulfate Monomers—These monomers were used in place of those listed in Example 1:

Percent
Ethyl acrylate _____ 28
Styrene _____ 67
Methacrylic acid _____ 5

Also, aluminum diacetate (Al(OH)(C₂H₃O₂))₂ was used in place of CaCl₂ in part (e). The $T_g$ of the polymer is calculated to be 57° C., by conventional and well-known procedures. The calculated $T_g$ for each of the other polymers of the examples falls below this figure. Taking Example 1 and this Example as the extremes, the Examples show polymers having calculated inherent $T_g$'s ranging from about 31° C. to about 57° C.

Similar results to those obtained in Example 1 were observed.

EXAMPLE 4

Example 2 was repeated substituting the following emulsion polymer system for the one employed in Example 2:

| | Percent |
|---|---|
| Ethyl acrylate | 45 |
| Styrene | 48 |
| Methacrylic acid | 7 |

Similar results were obtained as in Example 2.

EXAMPLE 5

Example 1 was repeated using the following emulsion polymer in place of the copolymer in that example:

| | Percent |
|---|---|
| Ethyl acrylate | 41.3 |
| Methyl methacrylate | 39.7 |
| Styrene | 11.0 |
| Methacrylic acid | 7.1 |

Similar results were obtained as in Example 1. The $T_g$ of the polymer is calculated to be 42° C., by conventional and well-known procedures.

EXAMPLE 6

Example 1 was repeated substituting 0.25 part of zinc acetate for calcium chloride in part (e). Similar results were obtained as in Example 1. The $T_g$ of the polymer is calculated to be 51° C., by conventional and well-known procedures.

EXAMPLE 7

(a) Seventy-two and a half parts of polymer dispersion from Example 5 was mixed with eleven parts of wax emulsion from Example 1 part (b), 0.35 part of tributoxyethylphosphate, one and a half parts of ethylene glycol monoethyl ether, 0.6 part of nonyl phenol modified with an average of 10 ethylene oxide units and .004 part of Surfactant F.

(b) Fifty parts of the resultant floor polish was modified by the addition of 0.25 part of magnesium acetate incorporated in the form of a powder.

(c) A homogeneous rubber floor tile, 9" x 9" in size, was divided into two equal parts. One half was coated with 1.5 mls. of the finished floor polish from part (a) and the other half with 1.5 mls. of the magnesium acetate modified polish from (b). After a 30-minute drying period at 25° C. and 50% relative humidity (R.H.), the tile halves were recoated with 1.5 mls. of the respective formulations. The tile half coated with the floor polish containing magnesium acetate dried with a high level of gloss and a uniform degree of leveling. The section of tile coated with the unmodified polish from section (a) was dull, mottled and had many rough spots which are normally associated with redispersion of the first polish coat upon the application of a new one. Both floor polishes were removed readily with a 3% water solution of NH₄OH. Similar results were obtained as in Example 1.

EXAMPLE 8

(a) Ten parts of emulsion polymer (66.7 parts of 15% polymer solids dispersion) from Example 4 were blended with ninety parts of polyethylene wax emulsion from Example 1, part (b) and 16.5 parts of alkyd solution from 1(c). This mixture was then modified by incorporation of .05 part of tributoxyethyl phosphate, 0.2 part of ethylene glycol monoethyl ether, 0.6 part of nonyl phenol modified with an average of 10 ethylene oxide units and 0.004 part by weight of Surfactant F.

(b) Fifty parts of the resultant floor polish was modified by the addition of one part of calcium acetate. The final formulation gave results similar to those in Example 1, parts (e) and (f).

EXAMPLE 9

(a) An emulsion copolymer was prepared with the following weight percent composition employing 3% (based on total weight of monomers) of octyl phenol modified with an average of 30 ethylene oxide units as the emulsifier and a conventional emulsion polymerization technique:

| | Percent |
|---|---|
| Methyl acrylate | 50 |
| Vinyltoluene | 49 |
| Acrylic acid | 1 |

(b) Emulsion polymer from (a) was substituted for the emulsion copolymer in Example 1. Similar results were obtained as in Example 1.

EXAMPLE 10

Example 9 was repeated substituting the following emulsion for the one used in Example 9:

| | Percent |
|---|---|
| 2-ethylhexyl acrylate | 25 |
| Styrene | 72 |
| Itaconic acid | 3 |

Similar results to those in Example 9 were obtained.

EXAMPLE 11

(a) A mixture of 40 parts of emulsifiable low molecular weight polyethylene melting at about 75° C. and 8 parts of oleic acid was melted and 8 parts of morpholine was added to the mixture. The complete melt was added slowly to 184 parts of water heated to 205° F. while under vigorous agitation. The emulsion was allowed to cool and was then diluted to 15% solids.

(b) Fifteen parts of an ammonia-soluble alkyd resin was added to 62.5 parts of water containing 3.75 parts of 28% NH₄OH solution and maintained at 50° C. The resulting solution was filtered and then diluted to 15% solids.

(c) An emulsion copolymer was prepared with the following weight percent composition employing 6% (based on total weight of monomers) octyl phenol modified with an average of 40 ethylene oxide units as the emulsifier and a conventional emulsion polymerization technique:

| | Percent |
|---|---|
| Ethyl acrylate | 45 |
| Methyl methacrylate | 50 |
| Dimethylaminoethyl methacrylate | 5 |

The final solids concentration of the emulsion was 40.0%. The emulsion was diluted with water to 15% polymer solids.

(d) Seventy-two and a half parts of the polymer dispersion obtained in part (c) was mixed with 5 parts of the wax emulsion of part (a) hereof and 10 parts of the alkyd solution of part (b) hereof. The resulting mixture was further modified by addition of 1.0 part of butyl benzyl phthalate, 3.0 parts of diethylene glycol monoethyl ether, 0.5 part of tributoxyethyl phosphate, 0.2 part of octyl phenol modified with an average of 40 ethylene oxide units and 0.008 part of Surfactant F.

(e) Fifty parts of the resultant floor polish obtained in part (d) was modified by the addition of 0.25 part of calcium hydroxide.

(f) A rubber floor tile, 9" x 9" in size, provided with a coating of an alkali-removable floor polish prepared with an emulsion copolymer of 45% ethyl acrylate, 50% methyl methacrylate and 5% methacrylic acid was divided into two equal parts. One half was coated with 1.5 ml. of thhe polish obtained in part (d) hereof and the other with 1.5 ml. of polish obtained in part (e) of this example. The tile half coated with the floor polish formulation from part (d) showed a significant degree of drag during the recoating step (usually associated in recoating operations with excessive softening of the bottom coat) and the resulting film after drying looked dull, was mottled and had many rough spots indicating a high degree of redispersion. The other tile half, which was coated with the floor polish formulation from part (e) of this example, recoated well with no evidence of drag and the resultant film was glossy and uniform.

EXAMPLE 12

Similar results were obtained as in Example 11 when the latter was repeated using in place of the calcium hydroxide (in part (e) of the example) in separate instances the same amount (except where noted) of the following salts:

(a) calcium acetate
(b) barium acetate
(c) magnesium chloride
(d) calcium chloride
(e) nickel chloride
(f) 2.5 parts manganese sulfate
(g) 4 parts of a solution of zinc tetraamine benzoate, the solution having been prepared by mixing 8.5 parts of zinc oxide into 70 parts of 28% ammonium hydroxide and then gradually adding 23 parts of benzoic acid.

EXAMPLE 13

(a) A copolymer dispersion was prepared as in Example 11(c) from a mixture of 30% of 2-ethylhexyl acrylate, 60% of styrene, and 10% of dimethylaminoethyl methacrylate and the solids concentration was adjusted to 15% with water.

(b) Twenty parts of carnauba wax was melted and then introduced into 120 parts of water at 95° C. which also contained 4 parts of oleic acid and 2.5 parts of morpholine.

(c) Seventy-two and a half parts of the polymer dispersion of part (a) hereof was mixed with 5 parts of the wax emulsion of part (b) hereof and 10 parts of the alkyd resin solution of Example 11(b). To this mixturue, there was also added 1.0 part of butyl benzyl phthalate, 3.0 parts of diethylene glycol monoethyl ether, 0.5 part of tributoxyethyl phosphate, 0.2 part of octyl phenol modified with an average of 40 ethylene oxide units and 0.008 part of Surfactant F.

(d) Fifty parts of the resultant floor polish was modified by the addition of 0.25 part of calcium hydroxide.

(e) An asphalt floor tile carrying a coating of an alkali-removable floor polish prepared with an emulsion copolymer of 45% ethyl acrylate, 50% methyl methacrylate, and 5% methacrylic acid was divided into two equal parts. One half was coated with 1.5 ml. of polish obtained in part (c) hereof and the other with 1.5 ml. of polish obtained in part (d) of this example. The tile half coated with the floor polish of part (c) showed a significant degree of drag during the recoating and the resulting films after drying looked dull, was mottled and had many rough spots indicating a high degree of redispersion. The other tile half, which was coated with the floor polish formulation from part (d) of this example, recoated well with no evidence of drag and the resultant film was glossy and uniform.

EXAMPLE 14

Similar results were obtained when the procedure of Example 13 was repeated substituting for the copolymer of part (a) in Example 13 a respective one of the following copolymers:

(a) 60% ethyl acrylate/35% vinyl acetate/7% 4-vinylpyridine,
(b) 55% n-butyl acrylate/35% methyl methacrylate/10% β-aminoethyl vinyl ether,
(c) 35% vinylidene chloride/30% ethyl acrylate/20% vinyltoluene/15% N - (dibutylaminoethyl)methacrylamide,
(d) a blend in 60/40 ratio of a copolymer of 45% ethyl acrylate, 54% ethyl methacrylate, and 1% 2-methyl-5-vinylpyridine with a copolymer of 40% butyl acrylate, 50% methyl methacrylate and 10% 2-vinylpyridine,
(e) 65% methyl acrylate/15% methyl methacrylate/12% vinyltoluene/8% β-dimethylaminoethyl-vinyl sulfide,
(f) 35% ethyl acrylate/28% acrylonitrile/17% methyl methacrylate/20% t-butylaminoethyl methacrylate.

EXAMPLE 15

(a) An emulsion copolymer is prepared with the following weight percent composition employing 6% (based on total weight of the monomer) of tertiary-octyl phenol modified by reaction with 40 ethylene oxide units as the emulsifier and a conventional emulsion polymerization technique:

| | Percent |
|---|---|
| 2-ethylhexyl acrylate | 10.0 |
| Vinyl acetate | 89.0 |
| Acrylic acid | 1.0 |

The final polymer solids concentration of the emulsion is 38%. The emulsion is diluted with water to 15% solids. The pH of the final emulsion is 4.5.

(b) Forty parts of emulsifiable low molecular weight polyethylene melting at about 75° C. is melted and added slowly to 184 parts of water heated to 205° F. under vigorous agitation and containing 10 parts of tertiary-octyl phenol modified with 5 ethylene oxide units and 2 parts of tertiary-octyl phenol modified with 30 ethylene oxide units. The emulsion is allowed to cool and is then diluted to 15% solids.

(c) Eighty parts of the polymer dispersion obtained in part (a) is mixed with 20 parts of wax emulsion from part (b). The resulting mixture is further modified by the addition of 0.35 part of tributoxyethyl phosphate, one and a half parts of ethylene glycol monoethyl ether, one and a half parts of diethylene glycol, 0.6 part of nonyl phenol modified with an average of 10 ethylene oxide units and .004 part of a fluorinated hydrocarbon surfactant of the formula $C_8F_{17}SO_2N(C_2H_5)CH_2$—COOK hereinafter referred to as Surfactant F.

(d) Fifty parts of the resultant floor polish is modified by the addition of 1.0 part of zirconium acetate incorporated in the form of a powder.

(e) A homogeneous vinyl floor tile, 9" x 9" in size, is divided into two equal parts. One half is coated with 1.5 mls. of the finished floor polish from (d) and the other half with 1.5 mls. of the zirconium acetate modified polish from (e). After a 30-minute drying period at 25° C. and 50% relative humidity (R.H.), the tile halves are recoated with 1.5 mls. of the respective formulations. The tile half coated with the floor polish containing zirconium acetate dries with a high level of gloss and a uniform degree of leveling. The section of title coated with the unmodified polish from section (d) is dull, mottled and has many rough spots which are normally associated with redispersion of the first polish coat upon the application of a new one. Both floor polishes are removed readily with a 3% water solution of $NH_4OH$.

The floor polish compositions containing acid copolymers and those ions which are susceptible to formation of water-soluble complexes or coordinate compounds with ammonia, such as zinc, provide polish coatings which are of special interest because even though they have a high level of resistance to alkaline floor cleaners, permitting their use for more efficient floor maintenance without marring the floor polish film, such polishes are still very easily removable with ammoniated cleaners providing the ammonia level in those compounds is in excess of certain minimum concentration (for example, 1%). In those systems at least part of the ammonia appears to tie up preferentially the polyvalent ions, thereby freeing the carboxyl groups to react with the remaining ammonia, if any, or other alkali, if present, or both in the stripping compound used for removal and resulting in severe swelling of the polymer and thus even eventual disintegration of the polish film. The concentration of free ammonia in the polish of the present invention is normally insufficient to remove, during the recoating operation, the polyvalent metal ions (from the previously deposited film of polish) capable of complexing or coordination with ammonia.

I claim:

1. A method of removing a dried floor polish having been applied to a floor in the form of an aqueous composition having a pH of from about 7 to about 11 and containing, as essential components, water, wax, a water-insoluble addition polymer prepared by emulsion polymerization of ethylenically unsaturated molecules comprising from about 1% to about 12% by weight of an $\alpha,\beta$-ethylenically unsaturated carboxylic acid, any content of alkali soluble resin being less than 50% by weight, based on the weight of the polymer, and 1% to 50% by weight, based on the weight of the polymer, of a polyvalent metal compound dissociable in the composition to form polyvalent metal containing ions, and drying the coating, the coating having a Knoop hardness of at least 0.5, being resistant to redispersion while being removable by suitable alkaline remover, and said composition having a solids content of between about 8% and 45% by weight, comprising the steps of applying to the floor an aqueous alkaline polish removing composition containing ammonia, and removing the coating.

2. The method of claim 1 in which said removing composition contains ammonia.

3. A method of removing a film from a solid substrate having controlled removability, said film being formed from an aqueous composition containing:

(1) an emulsion polymer consisting essentially of:
(a) at least one of a methacrylate monomer having the structural formula

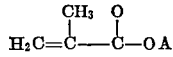

wherein A is a saturated alkyl radical having from one to four carbon atoms, acrylonitrile, methacrylonitrile, vinyl acetate, styrene, and vinyltoluene, (b) from about 1% to about 12% by weight of a polymerizable, ethylenically unsaturated monomer having the structural formula

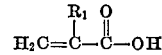

wherein $R_1$ is selected from the group consisting of a hydrogen atom and a methyl radical, (c) an ethylenically unsaturated monomer which is free from methyl groups on the alpha carbon atom having the structural formula $$CH_2=CH-X$$

wherein X is selected from the groups consisting of phenyl toluyl and the

radical wherein B is an alkyl radical having from 1 to 18 carbon atoms, (2) a resin composition containing:
(a) an alkali-soluble resin having an acid number from about 100 to about 145 and being a resin acid/dicarboxylic acid/polyol reaction product, and
(b) aqueous ammonia, (3) a polyvalent metal compound dissociable in the polymer emulsion to form polyvalent metal ions, the steps of applying an aqueous alkaline polish removing composition at a pH of from about 7.5 to 11 to said film and removing said film, and (4) wax.

4. The method of claim 3 in which said removing composition contains ammonia.

5. The method of claim 1 in which said metal is zinc.
6. The method of claim 2 in which said metal is zinc.
7. The method of claim 3 in which said metal is zinc.
8. The method of claim 4 in which said metal is zinc.

References Cited

UNITED STATES PATENTS

| | | | |
|---|---|---|---|
| 3,308,078 | 3/1967 | Rogers et al. | 260—27 R |
| 3,320,196 | 5/1967 | Rogers | 260—30.6 R |

ALLAN LIEBERMAN, Primary Examiner

U.S. Cl. X.R.

260—23 R, 27 R, 28.5 AV, 28.5 R, 29.6 RW, 29.6 R